US011340976B2

(12) United States Patent
Nakatsukasa et al.

(10) Patent No.: US 11,340,976 B2
(45) Date of Patent: May 24, 2022

(54) LOG INFORMATION COLLECTING DEVICE AND LOG INFORMATION COLLECTING METHOD

(71) Applicant: Nippon Telegraph and Telephone Corporation, Tokyo (JP)

(72) Inventors: Satoshi Nakatsukasa, Tokyo (JP); Masatoshi Saito, Tokyo (JP); Ken Takahashi, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/265,944

(22) PCT Filed: Jul. 24, 2019

(86) PCT No.: PCT/JP2019/028963
§ 371 (c)(1),
(2) Date: Feb. 4, 2021

(87) PCT Pub. No.: WO2020/031694
PCT Pub. Date: Feb. 13, 2020

(65) Prior Publication Data
US 2021/0303387 A1 Sep. 30, 2021

(30) Foreign Application Priority Data
Aug. 9, 2018 (JP) .............................. JP2018-150283

(51) Int. Cl.
*G06F 11/08* (2006.01)
*G06F 11/07* (2006.01)
*G06F 11/34* (2006.01)

(52) U.S. Cl.
CPC ...... *G06F 11/0787* (2013.01); *G06F 11/0769* (2013.01); *G06F 11/0775* (2013.01); *G06F 11/0781* (2013.01); *G06F 11/3476* (2013.01)

(58) Field of Classification Search
CPC ............. G06F 11/0787; G06F 11/0769; G06F 11/0775; G06F 11/0781; G06F 11/3476
See application file for complete search history.

(56) References Cited

U.S. PATENT DOCUMENTS

| 10,970,190 B2 * | 4/2021 | Kamran ................. G06F 17/40 |
| 2003/0236766 A1 * | 12/2003 | Fortuna ............... G06F 11/0751 |
| 2021/0064814 A1 * | 3/2021 | Kojima ............... G06F 11/0787 |

OTHER PUBLICATIONS

Ja.wikipedia.org, [online], "Log4j," 2018, retrieved on Jun. 26, 2018, retrieved from URL<https://ja.wikipedia.org/wiki/Log4j>, 9 pages (with English Translation).

* cited by examiner

Primary Examiner — Matthew M Kim
Assistant Examiner — Kyle Emanuele
(74) Attorney, Agent, or Firm — Fish & Richardson P.C.

(57) ABSTRACT

Disclosed herein are log information collection methods for collecting log information of a network device operating in accordance with instructions from an operation apparatus. In some cases, the log information collection method can comprise: determining whether another piece of the log information including a second character string occurs in a predetermined duration, wherein the niece of log, information includes a first character string; generating a new piece of log information including a third character string; and accepting specifications of the first, second, and third character strings, the predetermined duration, and occurrence or non-occurrence of the piece of the log information and the other piece of the log information.

4 Claims, 8 Drawing Sheets

Fig. 2

| LOG LEVEL | SUMMARY | DISPLAY/HIDE |
|---|---|---|
| ERROR | ERROR | DISPLAY |
| WARN | WARNING | |
| INFO | INFORMATION | |
| DEBUG | DEBUG INFORMATION | HIDE |
| TRACE | TRACE INFORMATION | |

| No | DETERMINATION TARGET LOG CHARACTER STRING | 53 PRE-AND-POST DETERMINATION DURATION | 54 | PRE-AND-POST LOG CHARACTER STRING | PRE-AND-POST LOG CHARACTER STRING EXISTENCE CONDITION | USER-DEFINED LOG CHARACTER STRING |
|---|---|---|---|---|---|---|
| | | PRE-DETERMINATION DURATION | POST-DETERMINATION DURATION | | | |
| 1 | xxx | X (SECONDS) | X (SECONDS) | yyy | EXISTENCE | ZZZ |
| 2 | aaa | — | X (SECONDS) | bbb | EXISTENCE | |
| | | — | X (SECONDS) | ccc | NON-EXISTENCE | |
| | | X (SECONDS) | — | ddd | EXISTENCE | EEE |
| 3 | fff | — | — | — | — | GGG |

Fig. 5

- DETERMINATION TARGET LOG CHARACTER STRING: Operation[aa]Start (CHARACTER STRING INCLUDED IN START LOG OF OPERATION)
- POST-DETERMINATION DURATION: Y SECONDS (PROCESSING TIME EXPECTED FOR OPERATION)
- PRE-AND-POST LOG CHARACTER STRING: Operation[aa]END (CHARACTER STRING INCLUDED IN END LOG OF OPERATION)
- PRE-AND-POST LOG EXISTENCE: NON-EXISTENCE
- USER-DEFINED LOG CHARACTER STRING: yyyy/mm/dd hh:mm:ss.sss [WARN]Operation[aa]delayed

POST-DETERMINATION DURATION

```
[2018/xx/xx hh:mm:ss.sss] [DEBUG] Operation[aa] Start          — 71
[2018/xx/xx hh:mm:ss.sss] [DEBUG] ○○○○○○○○○○○○○○○○○
[2018/xx/xx hh:mm:ss.sss] [DEBUG] ○○○○○○○○○○○○○○○○○
[2018/xx/xx hh:mm:ss.sss] [INFO] △△△△△△△△△△△△
[2018/xx/xx hh:mm:ss.sss] [DEBUG] ○○○○○○○○○○○○○○○○○
[2018/xx/xx hh:mm:ss.sss] [DEBUG] ○○○○○○○○○○○○○○○○○
                          .....
[2018/xx/xx hh:mm:ss.sss] [DEBUG] △△△△△△△△△△△△
[2018/xx/xx hh:mm:ss.sss] [DEBUG] ○○○○○○○○○○○○○○○○○
[2018/xx/xx hh:mm:ss.sss] [DEBUG] ○○○○○○○○○○○○○○○○○
[2018/xx/xx hh:mm:ss.sss] [DEBUG] ○○○○○○○○○○○○○○○○○
```

CONDITION IS SATISFIED: NEW LOG IS GENERATED (WARN LOG)

(b)

POST-DETERMINATION DURATION

```
[2018/xx/xx hh:mm:ss.sss] [DEBUG] Operation[aa] Start          — 71
[2018/xx/xx hh:mm:ss.sss] [DEBUG] ○○○○○○○○○○○○○○○○○
[2018/xx/xx hh:mm:ss.sss] [DEBUG] ○○○○○○○○○○○○○○○○○
[2018/xx/xx hh:mm:ss.sss] [INFO] △△△△△△△△△△△△
[2018/xx/xx hh:mm:ss.sss] [DEBUG] ○○○○○○○○○○○○○○○○○
[2018/xx/xx hh:mm:ss.sss] [DEBUG] ○○○○○○○○○○○○○○○○○
                          .....
[2018/xx/xx hh:mm:ss.sss] [INFO] Operation[aa] END             — 72
[2018/xx/xx hh:mm:ss.sss] [DEBUG] △△△△△△△△△△△△
[2018/xx/xx hh:mm:ss.sss] [DEBUG] ○○○○○○○○○○○○○○○○○
[2018/xx/xx hh:mm:ss.sss] [DEBUG] ○○○○○○○○○○○○○○○○○
[2018/xx/xx hh:mm:ss.sss] [DEBUG] ○○○○○○○○○○○○○○○○○
```

CONDITION IS NOT SATISFIED: NEW LOG IS NOT GENERATED

LOG INFORMATION COLLECTING DEVICE AND LOG INFORMATION COLLECTING METHOD

CROSS-REFERENCE TO RELATED APPLICATIONS

This application is a National Stage application under 35 U.S.C. § 371 of International Application No. PCT/JP2019/028963, having an International Filing Date of Jul. 24, 2019, which claims priority to Japanese Application Serial No. 2018-150283, filed on Aug. 9, 2018. The disclosure of the prior application is considered part of the disclosure of this application, and is incorporated in its entirety into this application.

TECHNICAL FIELD

The present invention relates to a log information collection apparatus and a log information collection method that collect log information of a network device operating in accordance with instructions from an operation apparatus.

BACKGROUND ART

In the related art, a system for performing operations based on control commands from an operator or other system, a predetermined scenario, or the like on a group of devices to be controlled (e.g., a network operation system or the like for a network operator to control a network device group) is provided with a log information collection function that collects log information (operation logs) related to an execution state of the operation and an operating status of the system. In the network operation system, it is necessary to accumulate log information that outputs execution results and states of the operation, and is used for detection of error occurrence and analysis at time of occurrence of problems.

Although a frequency at which the log information is output varies depending on the quality required for the system, the skill of the analyzer, and the like, the higher the frequency of output of the log information, the more information that can be used for the problem analysis increases, but a rate at which the log information is accumulated becomes larger, and thus, a mechanism is required that allows the operator to detect an important log without missing the log.

Thus, the network operation system is operated in such a way that an operator monitoring the state of the system determines whether to display a log on a monitoring screen for each level indicating an importance of a log. For example, logging utility software as described in Non Patent Literature (NPL) 1 provides six log levels as standard, and operates in such a way that only important logs can be seen among a large amount of output logs by not displaying, on a screen monitored by an operator, the log information of a log level belonging to detailed information that is output for purposes of debugging and analyzing during abnormalities, but displaying only logs indicating warnings and errors.

CITATION LIST

Non Patent Literature

NPL 1: "log 4j", [online], Wikipedia, [Search on Aug. 2, 2018], Internet: <URL: https://ja.wikipedia.org/wiki/Log4j>

SUMMARY OF THE INVENTION

Technical Problem

However, only log information that has been fixedly set as an operation log by the system and embedded in the program may not be sufficient for the operator to detect failures that have been newly discovered during operation, such as failures that could not be noticed at the time of program coding.

Among such failures, those output as a pattern across a plurality of logs including a log of a log level that is not displayed on the monitoring screen, those from which a part is missing which are otherwise output as a regular pattern, and the like, which can be detected by checking logs over a plurality of logs rather than one log, cannot be detected in an operation where only a specific log level is fixedly displayed on the monitoring screen as described in the known art.

The present invention has been made in view of such circumstances, and has an object to enable detection of defects that have not been anticipated in the system construction, defects that cannot be detected unless logs are monitored over a plurality of types of logs, and the like.

Means for Solving the Problem

In order to achieve the object described above, a first aspect of the present invention provides a log information collection apparatus for collecting log information of a network device operating in accordance with instructions from an operation apparatus, the log information collection apparatus including: a condition determination unit configured to determine, in a case that a piece of the log information collected from the network device includes a first character string, whether or not another piece of the log information including a second character string occurs in a predetermined duration before and after a time of occurrence of the piece of the log information including the first character string; a new log information generation unit configured to use an option of occurrence or non-occurrence of the other piece of the log information including the second character string in the predetermined duration as a trigger to generate a new piece of log information including a third character string; and a determination condition specifying unit configured to accept specifications of the first character string, the second character string, the third character string, the predetermined duration, and occurrence or non-occurrence of the piece of the log information including the first character string and the other piece of the log information including a second character string.

A fifth aspect of the present invention provides a log information collection method for collecting log information of a network device operating in accordance with instructions from an operation apparatus, the log information collection method including: a condition determination step of determining, in a case that a piece of the log information collected from the network device includes a first character string, whether or not another piece of the log information including a second character string occurs in a predetermined duration before and after a time of occurrence of the piece of the log information including the first character string; a new log information generation step of using an option of occurrence or non-occurrence of the other piece of the log information including the second character string in the predetermined duration as a trigger to generate a new piece of log information including a third character string; and a determination condition specification step of accepting, before the condition determination step and the new log information generation step, specifications of the first character string, the second character string, the third character string, the predetermined duration, and occurrence or non-occurrence of the piece of the log information and the other piece of the log information.

In this way, generating a new piece of log information including the character string specified (third character string) in the case that the condition specified for the collected log information is satisfied allows to generate a piece of log information in accordance with any situation without changing the system on the network device side. This can add log information corresponding to defects that have not been anticipated in the system construction, for example, serve to early discover system problems and detect failure signs, and thus, an improvement in system quality can be expected.

According to a second aspect of the present invention, in the log information collection apparatus, the determination condition specifying unit is capable of accepting a plurality of determination conditions specified including the second character string, the predetermined duration, and the occurrence or non-occurrence of the piece of the log information including the first character string and the other piece of the log information including a second character string, for a single combination of the first character string and the third character string, the condition determination unit determines whether or not each of the plurality of determination conditions specified for the single first character string is satisfied, and the new log information generation unit generates the new piece of log information including the third character string combined with the first character string in a case that all of the plurality of specified determination conditions are satisfied.

According to a sixth aspect of the present invention, in the log information collection method, in the determination condition specification step, a plurality of determination conditions specified including the second character string, the predetermined duration, and the occurrence or non-occurrence of the piece of the log information and the other piece of the log information are acceptable for a single combination of the first character string and the third character string; in the condition determination step, a determination is made on whether or not each of the plurality of determination conditions specified for the single first character string is satisfied; and in the new log information generation step, the new piece of log information including the third character string combined with the first character string is generated in a case that all of the plurality of specified determination conditions are satisfied.

In this way, a plurality of determination conditions specified can be accepted for a single combination of a first character string and a third character string, thereby, it is possible to add log information corresponding to defects that cannot be detected unless logs are monitored over a plurality of types of logs, for example, and thus, the defects in the system can be accurately monitored.

According to a third aspect of the present invention, the log information collection apparatus further includes a log cache unit configured to temporarily store the log information collected from the network device, the condition determination unit determines whether or not the log information stored in the log cache unit includes the other piece of the log information including the second character string, and the log cache unit sequentially deletes the log information in accordance with the predetermined duration.

According to a seventh aspect of the invention, in the log information collection method, the log information collected from the network device is temporarily stored in a log cache unit; in the condition determination step, a determination is made on whether or not the log information stored in the log cache unit includes the other piece of the log information including the second character string; and the log information collection method further includes a log deletion step of sequentially deleting the log information in the log cache unit in accordance with the predetermined duration.

In this way, sequentially deleting the log information in the log cache unit allows to suppress the stored amount in the log cache unit, which is advantageous for efficiently making condition determination.

According to a fourth aspect of the present invention, the log information collection apparatus further includes a determination condition recording unit configured to record individual items specified by the determination condition specifying unit as a determination condition, the predetermined duration is capable of specifying a pre-determination duration that specifies a duration before the time of occurrence of the piece of the log information including the first character string and a post-determination duration that specifies a duration after the time of occurrence of the piece of the log information including the first character string, and the log cache unit sequentially deletes the log information for which time elapses exceeding a period specified by a maximum value of the pre-determination duration recorded in the determination condition recording unit.

According to an eighth aspect of the present invention, in the log information collection method, individual items specified in the determination condition specification step is recorded as a determination condition in a determination condition recording unit, the predetermined duration is capable of specifying a pre-determination duration that specifies a duration before the time of occurrence of the piece of the log information including the first character string and a post-determination duration that specifies a duration after the time of occurrence of the piece of the log information including the first character string, and, in the log deletion step, the log information for which time elapses exceeding a period specified by a maximum value of the pre-determination duration recorded in the determination condition recording unit is sequentially deleted.

In this way, sequentially deleting the log information for which time elapses exceeding the period specified by the maximum value of the pre-determination duration, or in other words, storing the log information until the period specified by the maximum value of the pre-determination duration elapses allows the log information necessary and sufficient for the condition determination to be held.

Effects of the Invention

According to the present invention, it is possible to enable detection of defects that have not been anticipated in the system construction, defects that cannot be detected unless logs are monitored over a plurality of types of logs, and the like.

DESCRIPTION OF EMBODIMENTS

Hereinafter, preferred embodiments of a log information collection apparatus and a log information collection method according to the present invention will be described in detail with reference to the accompanying drawings. First, an operation system in which the log information collection apparatus according to an embodiment is installed will be described.

Figure 1:
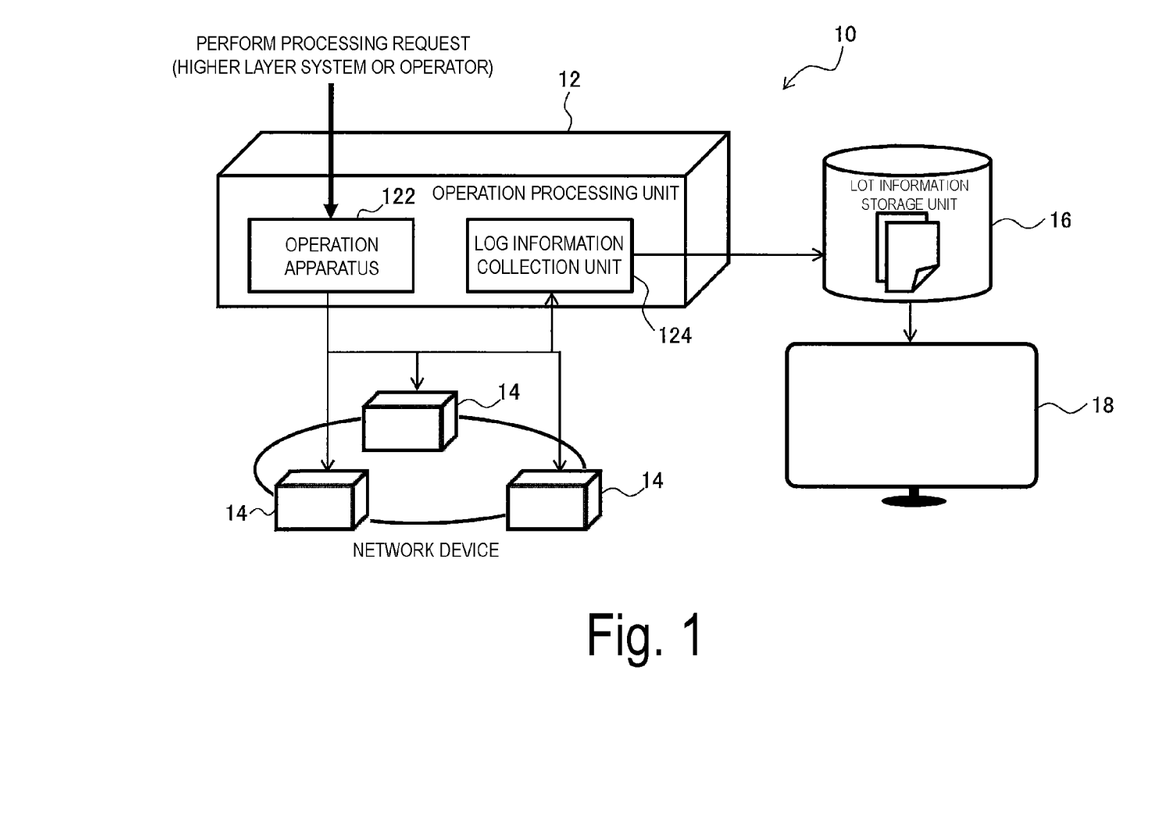
FIG. 1 is a diagram illustrating a configuration of an operation system.

FIG. 1 is a diagram illustrating a configuration of the operation system. An operation system 10 includes an operation apparatus 12, network devices 14, a log information storage unit 16, and a log information display unit 18.

The operation apparatus 12 includes an operation processing unit 122 and a log information collection unit 124. In the present embodiment, the log information collection unit 124 in the operation apparatus 12 functions as a log information collection apparatus. The operation processing unit 122 instructs the network devices 14 to perform various processes in accordance with a processing request from a higher layer system or a system operator. The log information collection unit 124 collects log information output from the network devices 14.

Each of the network devices 14 operates in accordance with an instruction from the operation apparatus 12 (operation processing unit 122). In the present embodiment, it is assumed that a plurality of network devices 14 are provided under the operation apparatus 12. The network device 14 outputs, to the operation apparatus 12 (log information collection unit 124), log information related to an execution state of the processing (including an execution result) and an operating status of the network device 14.

Figure 2:
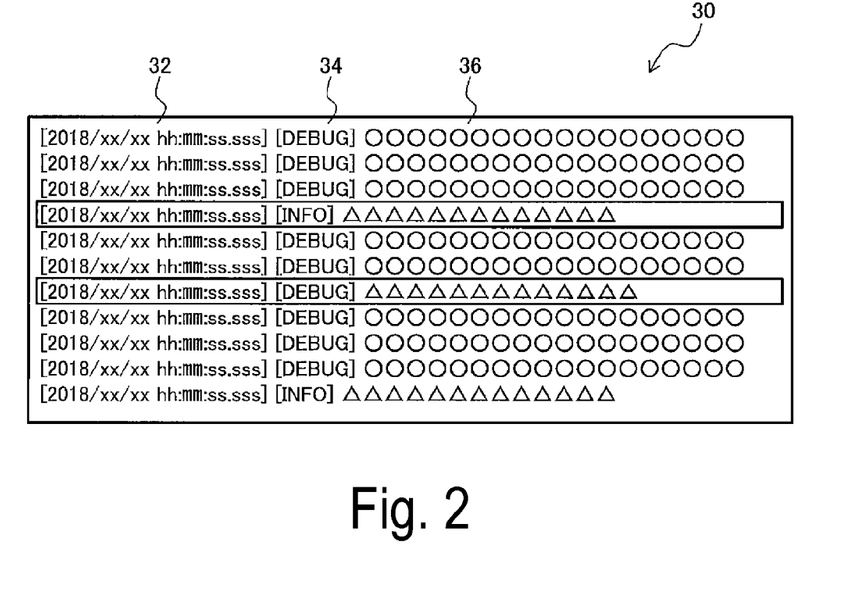
FIG. 2 is an example of log information output from a network device.

FIG. 2 is a diagram illustrating an example of the log information output from the network device.
In FIG. 2, each row corresponds to one piece of log information. Log information 30 includes a log information generation timestamp 32, a log level (content of log) 34, and detailed information 36. Examples of the log level 34 include [ERROR (error)], [WARN (warning)], [INFO (information)], [DEBUG (debug information)], and [TRACE (trace information)] (see FIG. 3).

The log information output from the network devices 14 is recorded in the log information storage unit 16. Some pieces of the log information recorded in the log information storage unit 16 are displayed on the log information display unit 18. An operator of the operation system 10 references the log information displayed on the log information display unit 18, and detects a failure or the like of the network device.

Among the log information stored in the log information storage unit 16, the log information displayed on the log information display unit 18 is defined in accordance with the log level.

Figure 3:
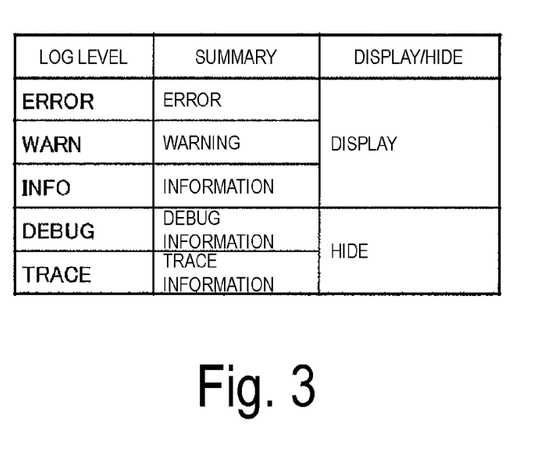
FIG. 3 is a table illustrating types of logs (log levels) displayed on a log information display unit.

FIG. 3 is a table illustrating types of logs (log levels) displayed on the log information display unit.
As described above, the log levels include [ERROR (error)], [WARN (warning)], [INFO (information)], [DEBUG (debug information)], and [TRACE (trace information)], and among these, [ERROR (error)], [WARN (warning)], and [INFO (information)] are displayed on the log information display unit 18, and [DEBUG (debug information)] and [TRACE (trace information)] are hidden.
In other words, the log information stored in the log information storage unit 16 is filtered in accordance with the log level to not display a log at or below a certain level, thereby preventing a significant log from being missed.

Figure 4:
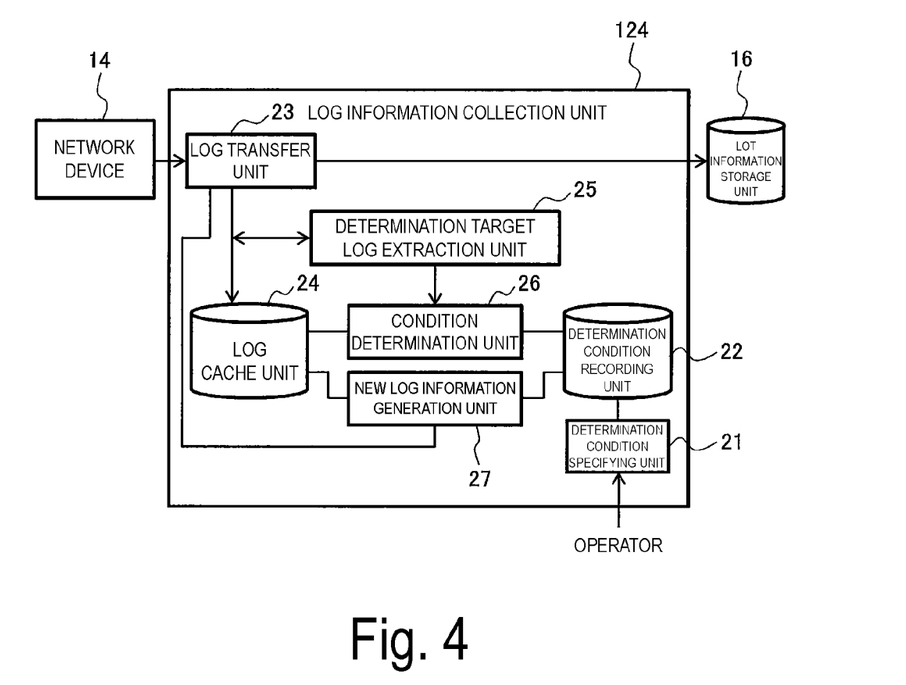
FIG. 4 is a block diagram illustrating a functional configuration of a log information collection unit.

Next, the log information collection unit 124 will be described in detail. FIG. 4 is a block diagram illustrating a functional configuration of the log information collection unit 124 (log information collection apparatus).
The log information collection unit 124 includes a determination condition specifying unit 21, a determination condition recording unit 22, a log transfer unit 23, a log cache unit 24, a determination target log extraction unit 25, a condition determination unit 26, and a new log information generation unit 27.

The determination condition specifying unit 21 accepts, from a user, in other words, an operator, a specification of a determination condition (each item illustrated in FIG. 5) used in the condition determination unit 26 described later. The determination condition recording unit 22 records determination conditions specified via the determination condition specifying unit 21.

Figure 5:
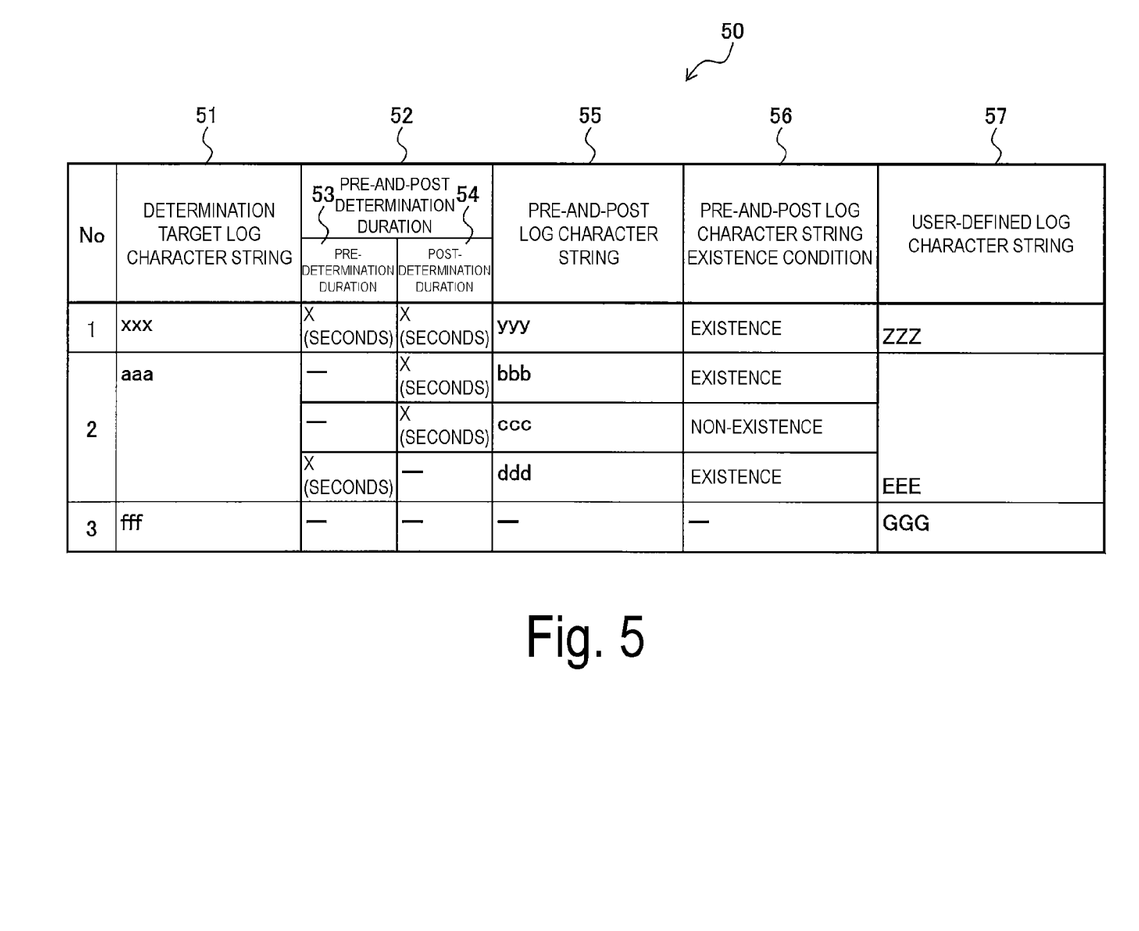
FIG. 5 is a table illustrating an example of determination conditions.

FIG. 5 is a table illustrating an example of the determination conditions.
A determination condition 50 includes a determination target log character string (first character string) 51, a pre-and-post determination duration 52 (a pre-determination duration 53, a post-determination duration 54: a predetermined duration), a pre-and-post log character string (second character string) 55, a pre-and-post log character string existence condition (occurrence or non-occurrence of log information) 56, and a user-defined log character string (third character string) 57. Note that the user-defined log character string 57 is not the determination condition itself, but is handled as the accompanying information of the determination condition.
These determination conditions (including the user-defined log character string 57) can be changed (including additions and deletions) at any timing via the determination condition specifying unit 21.

For example, a determination condition No. 1 indicates that in a case that a piece of log information including a character string [yyy] occurs in a period of time within X seconds (during pre-X seconds and post-X seconds) before or after a log containing a character string [xxx] occurs (in a case of existence), a new log containing a character string [ZZZ] is generated.

A determination condition No. 2 includes a plurality of conditions combined, and indicates that in a case that a piece of log information including a character string [bbb] is generated within X seconds (during post-X seconds) after a log containing a character string [aaa] occurs (a case of "existence") and any log information including a character string [ccc] does not occur within X seconds (during post-X seconds) after a log containing a character string [aaa] occurs (a case of "non-existence"), and further, a piece of log information including a character string [ddd] occurs within X seconds before the log containing the character string [aaa] occurs (a case of "existence"), a log containing a character string [EEE] is generated. In other words, in the determination condition No. 2, for a single combination of a first character string (character string [aaa]) and the third character string (character string [EEE]), a plurality of determination conditions specified including the second character string, the predetermined duration, and the occurrence or no-occurrence of log information can be accepted (specifically, determination condition 1: a piece of log information including the character string [bbb] occurs within X seconds (during post-X seconds) (the case of "existence"), determination condition 2: a piece of log information including the character string [ccc] does not occur within X seconds (during post-X seconds) (the case of "non-existence"), and determination condition 3: a piece of log information including the character string [ddd] occurs within pre-X seconds (the case of "existence")), and in a case that all of the plurality of specified determination conditions are satisfied, a new piece of log information including the third character string (character string [EEE]) combined with the first character string (string [aaa]) is generated.

A determination condition No. 3 indicates that in a case that a log containing a character string [fff] occurs, a log containing a character string [GGG] is generated. Note that the determination condition No. 3 is used in a case that only a specific log is desired to be displayed among log information of a log level (e.g., DEBUG) that is not normally displayed on the log information display unit 18.

Returning to the description of FIG. 4, the log transfer unit 23 transfers the log information collected from the network devices 14 to the log information storage unit 16 and to the log cache unit 24. In the present embodiment, the log transfer unit 23 transfers all of the log information collected from the network devices 14 to the log information storage unit 16 and to the log cache unit 24.

The log cache unit 24 temporarily stores the log information collected from network devices 14 (the log information transferred by the log transfer unit 23). In the present embodiment, the log cache unit 24 sequentially deletes the log information in accordance with the pre-and-post determination duration 52 (predetermined duration, see FIG. 5) included in the determination condition. More specifically, the log cache unit 24 sequentially deletes the log information for which time elapses exceeding the period specified by a maximum value of the pre-determination duration recorded in the determination condition recording unit 22. This makes it possible to suppress the stored amount of the log cache unit 24.

The determination target log extraction unit 25 extracts log information including the determination target log character string (first character string) 51 (hereinafter referred to as "determination target log information") among the log information collected from the network devices 14.

The condition determination unit 26 determines whether or not a determination condition corresponding to the determination target log information extracted by the determination target log extraction unit 25 is satisfied.

In other words, in a case that the log information collected from any of the network devices 14 includes the first character string (the determination target log character string 51), the condition determination unit 26 determine whether or not, before and/or after a time of occurrence of a piece of log information including the first character string (determination target log information), another piece of log information including the second character string (pre-and-post log character string 55) occurs in a predetermined duration (pre-and-post determination duration 52). Note that whether or not another piece of log information occurs includes cases that another piece of log information occurs and does not occur.

For example, assume that, as a determination condition for determination target log information A (a piece of log information including a determination target character string [rrr]), a pre-determination duration of a second, a pre-and-post character string of [nnn], and a pre-and-post log character string existence condition of "existence" are set. In this case, the condition determination unit 26 searches the log information already recorded in the log cache unit 24, and determines whether or not there is another piece of log information including the pre-and-post character string [nnn] occurring in the pre-determination duration. If there is another piece of log information including the pre-and-post character string [nnn] occurring in the pre-determination duration, the condition is satisfied, and if not, the condition is not satisfied.

For example, assume that, as a determination condition for determination target log information B (a piece of log information including a determination target character string [sss]), a post-determination duration of β second, a pre-and-post character string of [mmm], and a pre-and-post log character string existence condition of "existence" are set. In this case, the condition determination unit 26 monitors the log information recorded in the log cache unit 24 during the post-determination duration of β second, and determines whether there is another piece of log information including the pre-and-post character string [mmm] occurring in the post-determination duration. If there is another piece of log information including the pre-and-post character string [mmm] occurring in the post-determination duration, the condition is satisfied, and if not, the condition is not satisfied.

In this way, in the case that only the pre-determination duration is set as the determination condition for the determination target log information, the determination can be made at the time when the determination target log information is extracted, and in the case that the post-determination duration is set, the determination is continued after the determination target log information is extracted until the post-determination duration elapses. Among the log information recorded in the log cache unit 24, the log information for which time elapses exceeding the period specified by the maximum value of the pre-determination duration recorded in the determination condition recording unit 22 has no possibility to match the determination condition, and thus, is deleted from the log cache unit 24 as described above.

In a case that the condition determination unit 26 determines that a determination condition corresponding to the determination target log information is satisfied, the new log information generation unit 27 generates a new piece of log information including the user-defined log character string 57 specified in association with the determination condition. In other words, in a case that the pre-and-post log character string existence condition of "existence" and another piece of log information including the second character string (pre-and-post log character string 55) occurs in the predetermined duration (pre-and-post determination duration 52) or in a case that the pre-and-post log character string existence condition of "non-existence" and the other log information including the second character string (pre-and-post log character string 55) does not occur in the predetermined duration (pre-and-post determination duration 52), the new log information generation unit 27 generates a new piece of log information including the third character string (user-defined log character string 57). The new log generated by the new log information generation unit 27 is transferred to the log information storage unit 16 by the log transfer unit 23. The new log may also be transferred to the log cache unit 24.

Hereinafter, as an example of detecting an internal operation problem that is missed in a simple log monitoring, a case of detecting a delay of operation processing will be described.

Figure 6:
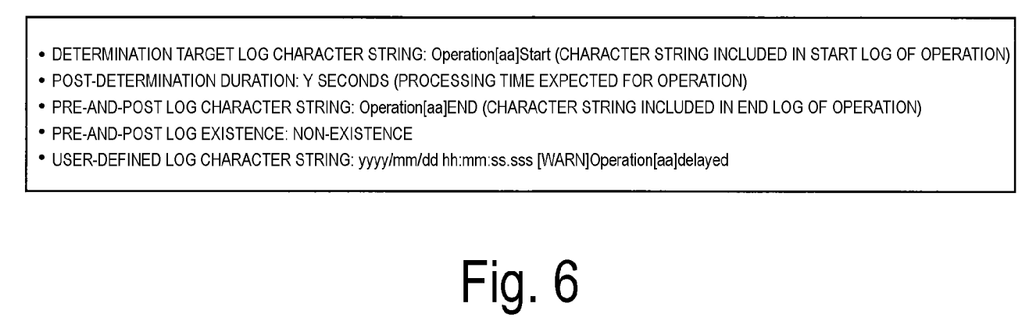
FIG. 6 is an example of a determination condition for detecting an operation processing delay.

FIG. 6 is an example of a determination condition for detecting an operation processing delay.

In the example in FIG. 6, the determination target log character string (first character string) 51 is set as a characters string [Operation[aa]Start] that is included in a start log of the operation, the post-determination duration 54 is set as a prediction value (Y second) of a processing time required for the operation, the pre-and-post log character string (second character string) 55 is set as a character string [Operation[aa]END] that is included in an end log of the operation, the pre-and-post log character string existence condition (occurrence or non-occurrence of log information) 56 is set as [non-existence], and the user-defined log character string (third character string) 57 is set as [yyyy/mm/dd hh:mmss.sss (time of log generation) [WARN]Operation[aa] delayed].

Figure 7:
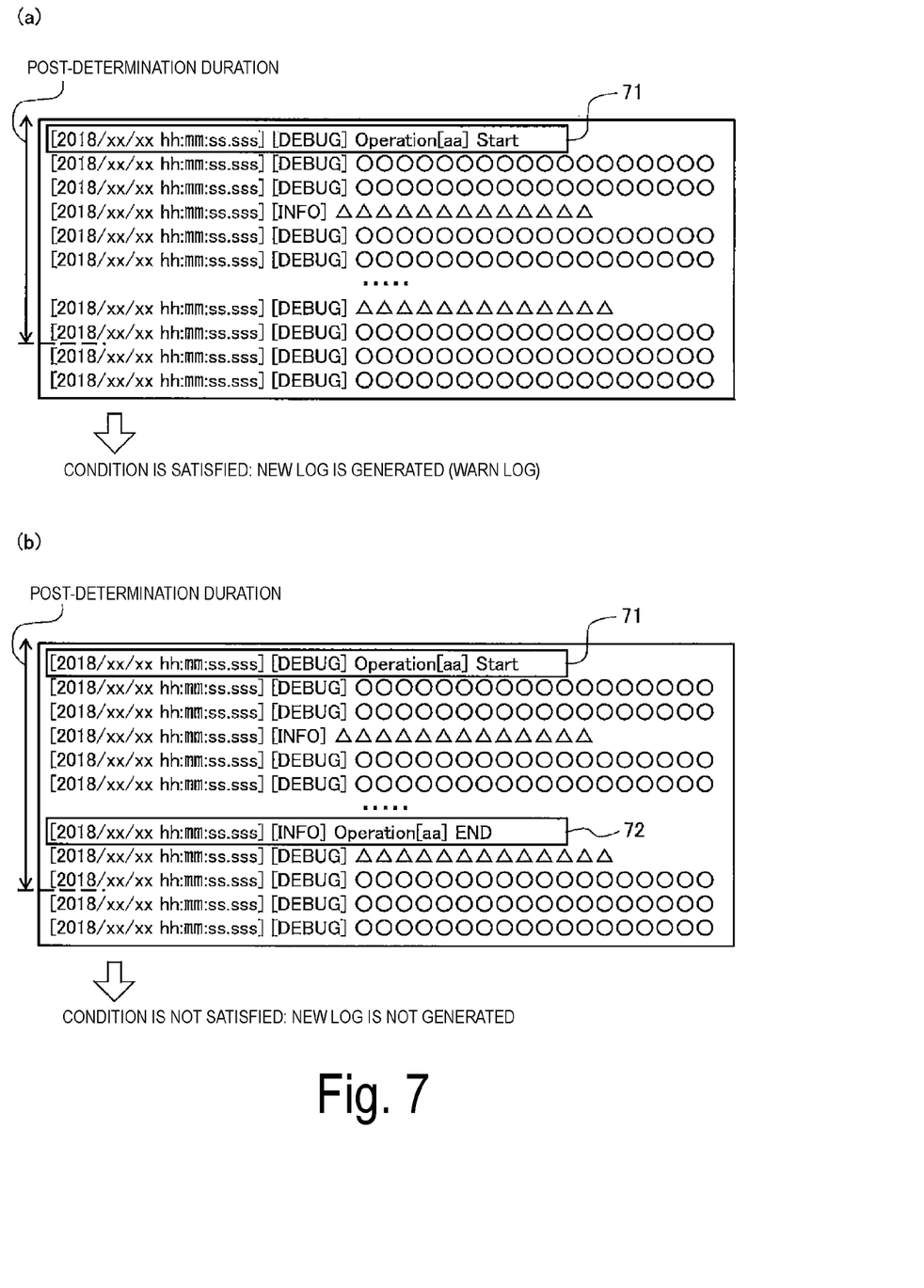
FIG. 7 is an example of log information temporarily stored in a log cache unit.

FIG. 7 is an example of log information temporarily stored in the log cache unit. In FIG. 7(*a*), determination target log information (reference sign 71) including the determination target log character string [Operation[aa] Start] is recorded in the top row, and the log information generated after the determination target log information is generated is sequentially recorded in subsequent rows. However, no piece of log information including the pre-and-post log character string [Operation[aa]END] occurs within the post-determination duration 54. Thus, a delay in the operation is suspected, and a new log [yyyy/mm/dd hh:mm:ss.sss (time of log generation) [WARN]Operation[aa]delayed] is generated by the new log information generation unit 27 and transferred to the log information storage unit 16. This new log, because of having a log level [WARN (warning)], is displayed on the log information display unit 18, and allows the operator to be notified of the operation delay.

In FIG. 7(*b*) also, similarly to FIG. 7(*a*), determination target log information (reference sign 71) including the determination target log character string [Operation[aa] Start] is recorded in the top row, and the log information generated after the determination target log information is generated is sequentially recorded in subsequent rows. In FIG. 7(*b*), a piece of log information (reference sign 72) including the pre-and-post log character string [Operation [aa]END] occurs within the post-determination duration 54. Thus, since the operation has ended as planned, no new log is generated.

Figure 8:
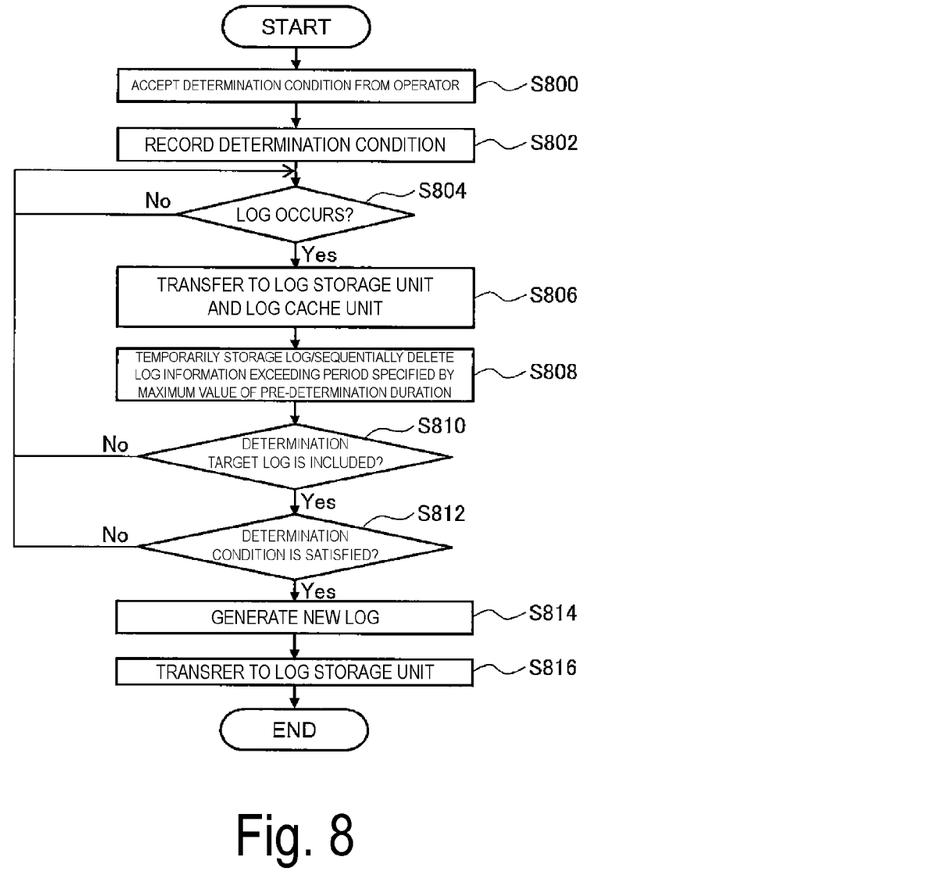
FIG. 8 is a flowchart illustrating a process of the log information collection unit.

FIG. 8 is a flowchart illustrating a process of the log information collection unit (log information collection apparatus).

First, the determination condition specified (including the user-defined log character string 57) is accepted from the operator via the determination condition specifying unit 21 (step S800: a determination condition specifying step). The specified determination condition is recorded in the determination condition recording unit 22 (step S802). As described above, the determination conditions can be changed sequentially by the operator.

When log information occurs in the network devices 14 (step S804: Yes), the log transfer unit 23 transfers the collected log information to the log information storage unit 16 and the log cache unit 24 (step S806). In a case that no log occurs in the network devices 14 (step S804: No), the log transfer unit 23 waits until a log occurs (return to step S804). The log cache unit 24 temporarily stores the transferred log information, and sequentially deletes log information for which time elapses exceeding the period specified by the maximum value of the pre-determination duration recorded in the determination condition recording unit 22 (step S808: log deleting step).

The determination target log extraction unit 25 determines whether or not the determination target log information is included in the log information transferred to the log cache unit 24 (step S810).

In a case that no determination target log information included (step S810: No), the process returns to step S804 without a specific operation.

In a case that the determination target log information is included (step S810: Yes), the condition determination unit 26 determines whether or not a determination condition corresponding to the determination target log information is satisfied (step S812: a condition determining step).

In a case that the determination condition is satisfied (step S812: Yes), a new piece of log information including the user-defined log character string 57 specified in association with the determination condition is generated by the new log information generation unit 27 (step S814: new log information generating step), and the log transfer unit 23 transfers the generated piece of log information to the log information storage unit 16 (step S816).

In a case that the determination condition is not satisfied (step S812: No), the process returns to step S804 without a specific operation.

As described above, the operation apparatus 12 (log information collection unit 124) according to the embodiment generates a new piece of log information including the character string specified by the operator (third character string) in the case that the condition specified by the operator is satisfied, and thereby, the operation apparatus 12 (log information collection unit 124) can generate log information in accordance with any situation without changing the system on the network device 14 side. This can add log information corresponding to defects that have not been anticipated in the system construction, for example, serve to early discover system problems and detect failure signs, and thus, an improvement in system quality can be expected.

A plurality of determination conditions specified can be accepted for a single combination of a first character string and a third character string, which makes it possible to add log information corresponding to defects that cannot be detected unless logs are monitored over a plurality of types of logs, for example, and thus, the defects in the system can be accurately monitored.

By sequentially deleting the log information in the log cache unit 24, the stored amount in the log cache unit can be suppressed, which is advantageous for efficiently making condition determination.

In particular, by sequentially deleting the log information for which time elapses exceeding the period specified by the maximum value of the pre-determination duration, or in other words, by storing the log information until the period specified by the maximum value of the pre-determination duration elapses, the log information necessary and sufficient for the condition determination can be held.

REFERENCE SIGNS LIST

10 Operation system
12 Operation apparatus

14 Network device
16 Log information storage unit
18 Log information display unit
122 Operation processing unit
124 Log information collection unit (log information collection apparatus)
21 Determination condition specifying unit
22 Determination condition recording unit
23 Log transfer unit
24 Log cache unit
25 Determination target log extraction unit
26 Condition determination unit
27 New log information generation unit

The invention claimed is:

1. A log information collection method for collecting log information of a network device operating in accordance with instructions from an operation apparatus, the log information collection method comprising:
   determining, in a case that a piece of the log information collected from the network device includes a first character string, whether or not another piece of the log information including a second character string occurs in a predetermined duration before and after a time of occurrence of the piece of the log information including the first character string;
   generating a new piece of the log information including a third character string using an occurrence or non-occurrence of the another piece of the log information including the second character string in the predetermined duration as a trigger; and
   accepting, before the determining, and the generating, specifications of the first character string, the second character string, the third character string, the predetermined duration, and occurrence or non-occurrence of the piece of the log information and the another piece of the log information.

2. The log information collection method according to claim 1, wherein
   the accepting comprises specifying a plurality of determination conditions including the second character string, the predetermined duration, and the occurrence or non-occurrence of the piece of the log information and the another piece of the log information are acceptable for a single combination of the first character string and the third character string,
   the determining comprises determining whether each of the plurality of determination conditions specified for the first character string is satisfied, and
   the generating comprises generating the new piece of log information including the third character string combined with the first character string when all of the plurality of specified determination conditions are satisfied.

3. The log information collection method according to claim 2, wherein
   the log information collected from the network device is temporarily stored in a log cache unit,
   the determining comprises determining whether the log information stored in the log cache unit includes the another piece of the log information including the second character string, and
   the log information collection method further comprises sequentially deleting the log information in the log cache unit in accordance with the predetermined duration.

4. The log information collection method according to claim 3, wherein
   the specifications comprises specifying individual items that are recorded as a determination condition in a determination condition recording unit,
   the predetermined duration is capable of specifying a pre-determination duration that specifies a duration before the time of occurrence of the piece of the log information including the first character string and a post-determination duration that specifies a duration after the time of occurrence of the piece of the log information including the first character string, and
   the log information for which time elapses of the pre-determination duration exceeding a period specified by a maximum value of the pre-determination duration recorded in the determination condition recording unit is sequentially deleted.

* * * * *